United States Patent [19]
Davister

[11] 3,830,658

[45] Aug. 20, 1974

[54] METHOD AND DEVICE FOR WASHING A CONTINUOUS FILTER WITH A HORIZONTAL FILTRATION SURFACE AND CELLS

[75] Inventor: Armand Davister, Liege, Belgium

[73] Assignee: Societe de Prayon, Prayon (Commune de Foret), Belgium

[22] Filed: June 13, 1972

[21] Appl. No.: 262,259

[52] U.S. Cl.............. 134/13, 134/21, 134/36, 134/80, 209/158, 210/328, 210/333, 210/391
[51] Int. Cl.............. B08b 7/04, B01d 35/00
[58] Field of Search............ 134/13, 21, 34, 79, 80, 134/104; 210/407, 408, 409, 416, 411, 328, 332, 333, 391; 209/13, 133, 155, 158

[56] References Cited
UNITED STATES PATENTS

| | | | |
|---|---|---|---|
| 2,997,068 | 8/1961 | Roos | 210/328 |
| 3,357,567 | 12/1967 | Wake | 210/408 |
| 3,397,783 | 8/1968 | Pearce | 210/328 |

OTHER PUBLICATIONS

The Bird Prayon Filter, Bird Machine Company, South Walpole, Massachusetts, 1956 (received in U.S.P.O.), pp. 1–8.

Bird–Prayon Tilting Pan Vaccum Filter, Bird Machine Company, South Walpole, Mass., 1964 (received in U.S.P.O.), pp. 1–8.

*Primary Examiner*—Morris O. Wolk
*Assistant Examiner*—Dale Lovercheck
*Attorney, Agent, or Firm*—McGlew and Tuttle

[57] ABSTRACT

Method for washing with water a continuous filter with a horizontal filtration surface and cells, washing carried out after the discharge of the filtration cake, wherein water jets of high kinetic energy are used and/or heavily turbulent water flows in order to cause a mechanical scouring of possible sediments and scales formed at least on the walls of the filters and on the cloths of the latter in the course of filtration and to take such sediments and/or scales away by mechanical means. Wash water is supplied internally of the cells.

6 Claims, 3 Drawing Figures

METHOD AND DEVICE FOR WASHING A CONTINUOUS FILTER WITH A HORIZONTAL FILTRATION SURFACE AND CELLS

The present invention relates to a method for washing a continuous filter with a horizontal filtration surface and cells, after the discharge of the filtration cake.

The said filter cells comprise pans of various shapes, depending on the type of filter, vacuum resistant and having a horizontal filtration surface comprised of a cloth and a support for such cloth. The cell further comprises a filtrate discharge piping or a filtrate outlet connected to a distributor whose function is to separate the different filtrates. At present, three types of filters of this kind are known: the filters with tilting cells arranged in a circle around a central distributor, the filters with a circular table wherein the different cells remain horizontal and are connected in a rigid manner so as to provide a continuous horizontal filtration surface in the shape of a circular ring arranged around a central distributor and, lastly, filters with rectangular cells sliding end to end on parallel rails in which case the distributor is of elongated shape so as to extend parallel to the said slide rails and to be in contacting relationship with the bottom of each cell by means of a leak-proof sliding joint. Filters of this type have been illustrated and briefly described in "Revue Industrie Technik und Maschinenwelt Heft 1/1959."

The filtration of slurries and the washing of the cake thereof on such filters present, in certain cases, large difficulties on account of the fast formation of heavy scaling which is very adhesive and hard on the cloths and in the pipe-runs of the filtration and washing liquids, which necessitates frequent stoppages and expensive manual cleaning operations. This occurs, for instance, when filtering slurries containing, in the solid shape, hemihydrate calcium sulphate.

Up to the present, in order to overcome this disadvantage, such filters are provided with means allowing a swilling for dissolving the scales and the sediments formed on the filtration surfaces. Thus, in the case of filters with tilting cells, after having discharged the cake, the tilted cells are continuously washed by means of washing pipe-runs delivering to the cloth large quantities of water not saturated with dissolved sealing substances. Above all, it is expected to dissolve by this known method the scaling matters.

These means and this washing method prove themselves, however, inadequate in many cases and are particularly unable to protect the interior of the filtration cells and the lower face of the cloth from scaling.

The aim of the present invention consists essentially to overcome the said disadvantages and to offer a very simple method, probably already applied in other fields than that of filtration, but which applied in the specific field of filtration yields cleansings which are at least unexpected and extremely efficient.

For that purpose, water jets of high kinetic energy are used and/or heavily turbulent water flows in order to cause a mechanical scouring of the scales and the taking away thereof.

According to the invention, a pressure differential of more than one kilog. is necessary and sufficient to impart the necessary kinetic energy to a water jet if the transformation in kinetic energy takes place without undue losses.

The present invention also relates to a special washing by means of which it is possible to obtain an efficient cleansing of the inner face of the filtration cloth and of the cell portions extending beneath such cloth.

According to the invention, a washing liquid is directly forced inside of the cell volume provided beneath the filtration cloth, in order to wash the inner face of such cloth, the inner walls of the cell and the cloth support, so that the kinetic energy of the said liquid shall be sufficient to take along the sediments and the scales substantially formed in such space and shall not, in any case, be broken or annulled when passing through the cloth.

Advantageously, in the case of filters with tilting cells, the method according to the invention provides introducing the said washing liquid in the said cell volume at least at the moment when the cell tilts and at least in the portion of the cell subject to an upwardly directed rotation, so that the liquid may be subject to a fast flow in the said space under gravity actuation, thus taking along mechanically, i.e., by means of scouring, the scales and sediments eventually formed on the inner face of the cloth and on the support thereof as well as on the inner faces of the cell.

The present invention lastly relates to a washing appliance for working the special method permitting to secure an efficient washing of the inner face of the cloth and of the cell faces positioned beneath such face.

This appliance is characterised in that it comprises at least one washing pipe-run mounted in the volume provided inside each cell on the side of the bottom face of the filtration cloth.

Advantageously, in the case of tilting cells filters, the washing pipe-runs being stationary with reference to the cells, such pipe-runs are connected by flexible tubes to a distributor of the washing liquid.

Other details and features of the invention will become apparent from the description, hereinafter given, by way of non-limiting example of some particular embodiments of the method according to the invention and of a special appliance for working a modified form of such process, with reference to the drawings accompanying the present specification.

Figure 1:
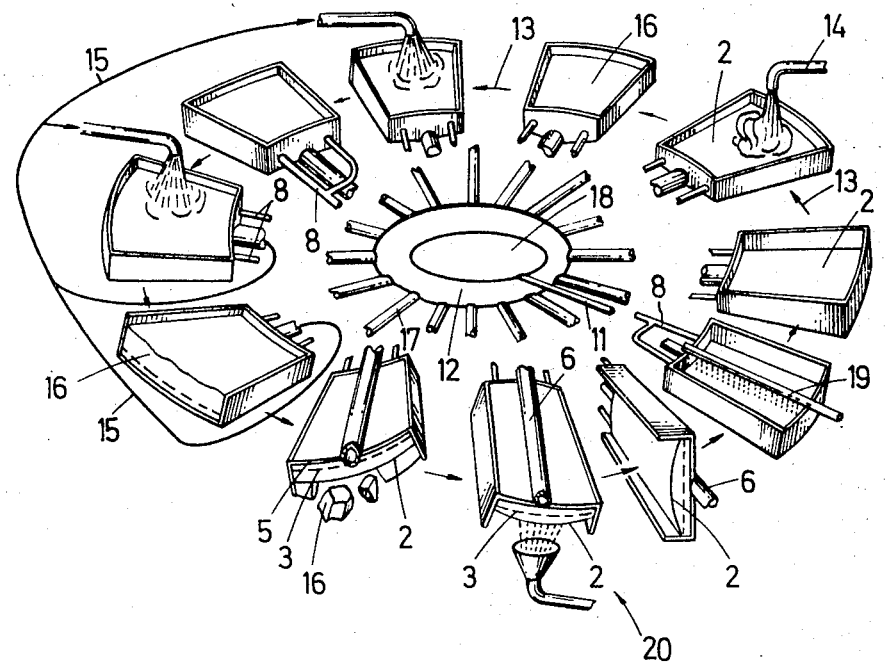
FIG. 1 is a diagrammatic perspective view, partially broken away, of a continuous horizontal filter with tilting cells.

In the three Figures, the same numerical references designate the same components.

The method according to the invention actually consists in using the scouring characteristics of a flowing liquid in order to wash continuous filters with horizontal filtration face and with cells as well as, to a rather negligible extent, the dissolving characteristic which was, up to the present, the means sought to wash the said filters.

In this connection it was noted, according to the invention, that washing with highly pressurized water, preferably from 2 through 15 kg/cm2 pressure, at the points to be cleaned of the filter enables to eliminate, in the majority of cases, the scales which were formed in the course of filtration by the slurry to be filtered. Such washing takes place for preference in the cycle of the operations to be carried out on the filter prior to supplying the slurry to the cells and after the ordinary washings of the cloths after the discharge of the cake.

The jets of liquid having a large kinetic energy are projected on the portions of the cells to be washed, in particular on to the cloths, in such a manner as to take along mechanically, i.e., by scouring, the possible scales which may have formed on the said portions.

It is very important to eliminate the washing liquids as and when they are projected in order to prevent swamping the portions to be cleaned as in such a case the efficiency of the washing is much reduced. Moreover, it is necessary for the cell to be fully drained prior to supplying the slurry of the following cycle.

These aims are advantageously reached by applying a depression at the outlet of the cells thus causing a fast and heavily turbulent flow of the washing liquid.

The washing, according to the invention, may be provided by means of pipe-runs with holes or provided with direct jet nozzle atomizers (so-called descaling nozzles), in order to provide a maximum kinetic energy of the massive jets which may be produced by such pipe-runs. The washing liquid passes successively through the cloth, the cell and the distributor and is withdrawn under vacuum by means of a barometric fall pipe and, if need be, of an air-liquid separator connected to a vacuum source.

The fact that the predominant action of the washing liquid is a mechanical scouring and not a dissolution, as in the known washing methods, permits to recycle substantially the total quantity of the washing liquid after a possible settling of the solids, which makes it possible to solve, in a very simple manner, the considerable problem of the water and waste water balances, so that the quantity of fresh water needed may be reduced to nearly zero. In the known methods of washing filters of the said type, water is used in a large quantity and with a heavy flow so as to favor as far as possible the dissolution of the scales in this water. This manner of proceeding calls for a substantial consumption of energy and for important and costly plants. Moreover, in order to achieve a satisfactory efficiency of dissolving and, consequently, washing the cells, the washing water has to contain a minimum of dissolved matter which reduces the rate of possible recycling and causes a heavy consumption of fresh washing water.

Let us also note that thanks to the washing liquid being drawn to the base of the cells, the flow pipes and the distributor remain clean because of the heavy scouring effect of the heavily turbulent flow under the accelerating vacuum effect.

The fact of striking the top face of the cloth and of the support of the latter by highly pressurized liquid jets having thus a large kinetic energy assures a perfect cleaning of such top face.

In order to achieve an equivalent cleaning of the bottom face of the cloth and support as well as of all the portions of the cells positioned beneath such cloth, according to the invention, a washing liquid is furnished directly to the space provided beneath the filtration cloth, after discharging the cake, so that this washing water may flow with an adequate kinetic energy along such bottom face of the cloth and of the parts to be cleaned positioned beneath the latter without such energy being absorbed on passing through the cloth.

Depending on the position of the cell and on the kinetic energy inherent to the jets of water directed against one of the cloth faces, such water may eventually pass through the latter. In any case, the kinetic energy of the washing water having passed through the cloth is no longer sufficient to achieve the mechanical action (scouring) causing the needed cleaning of the other face of the cloth.

This is why it is useful, according to the invention, to provide for a double washing, i.e., a washing by jets of water striking directly the top face of the cloth and by means of jets of water striking directly the inner face of such cloth as well as the parts positioned beneath the latter and to combine the whole thereof with the accelerating action of the vacuum for the flowing of the waters.

In the case of tilting cells filters, the inside of the cells is washed for preference following the discharge of the cake, at the time of washing the outer face of the tilted cell in the course of straightening up so as to be able to benefit from gravity in order to impart to the inner washing water a very useful fast flow. This allows to impart to the liquid an adequate kinetic energy for a minimum pressure, amounting from 0.2 to 1 kg/cm2, in order to achieve an adequate scouring effect on the scales which might have possibly formed.

The washing water is for preference admitted to the portion of the cell, beneath the cloth, subject to an upwards directed rotation at the moment when it straightens out, so that the liquid may, under the action of gravity, be subject to a fast flow in the volume provided beneath the cloth over the whole of the inner or bottom face of the cloth.

It is preferable to carry out preventive washings in order to remove solid matters deposited prior to scaling. Such preventive washing may be achieved by carrying it out in a permanent manner at each filtration cycle prior to the supply of the slurry.

In order to illustrate further the method according to the invention, a description is hereinafter given by way of non limiting example with reference to the aforesaid accompanying drawings.

The filter, illustrated in FIG. 1, is a so-called "horizontal filtration surface with tilting cells" filter. This comprises a series of identical cells 1 having substantially the aspect of a sector and moving along a circumference in the direction of the arrows 13 around a central stationary vacuum distributor 12 provided at the centre of such circumference.

Such cells 1 move in a continuous manner along such circumference.

A series of successive operations take place for each of the cells 1 in the course of a complete movement through 360° around the distributor 12.

At a well defined point of the circuit of the cells 1, the slurry is poured in the cells. This point has been diagrammmatically shown by a slurry supply tube bearing the reference 14. After removal of the filtrate from the cell, the filtration cake 16 formed on the filter cloth is subjected to two successive counterflow washings, as shown diagrammatically by the arrows 15.

Subsequently, the cells are tilted so as to evacuate the filtration cake 16. This operation is then followed by a new washing with water of the filter cloth while the cell remains in its reversed position illustrated in 20.

All these operations, so far described, are part of the current filtration technique by means of a filter with a horizontal surface and tilting cells.

According to the invention, this last washing is followed or accompanied by a special washing of the inner face of the filtration cloth and of the inner portions of the cell by furnishing directly washing water to the volume of the said cell beneath the filtration cloth for at least the time needed during which the cell straightens out to return to its normal horizontal position.

This washing is carried out by means of a double washing pipe-run 8 mounted in the space provided beneath the filtration cloth.

Figure 2:
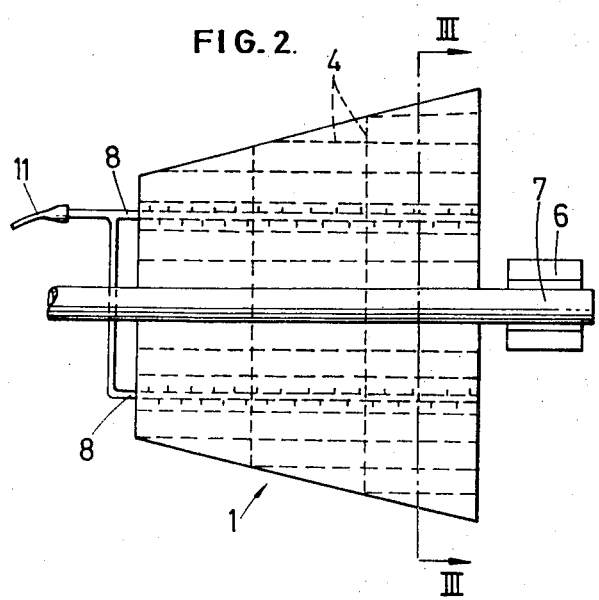
FIG. 2 is a plan view, on a larger scale, of a filter cell illustrated in FIG. 1, the filtration cloth being withdrawn and the cell tilted.
Figure 3:
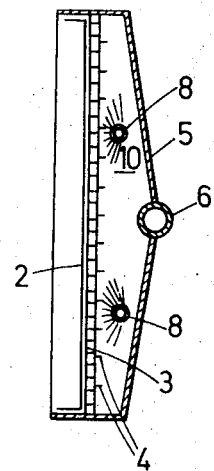
FIG. 3 is a sectional view along the line III—III of FIG. 2.

FIGS. 2 and 3 show in detail the construction of a cell 1 comprising such pipe-runs 8.

As already described above, a cell 1 comprises a pan, generally of stainless steel, wherein is positioned a filtration cloth 2 resting on a support 3 comprising, for instance, a grid or a special rubber carpet with projecting portions supporting the cloth. This support permits providing beneath the bottom face of the cloth space facilitating the flow of the filtrates and of the washing waters.

The support 3 is carried in turn on a series of cross members 4 extending on the bottom 5 of the cell within a space 10 provided beneath the cloth 2. The bottom 5 slopes towards the central tube 6 extending parallel to such bottom and integral with the latter, this tube recovering the filtrates and the washing waters to direct them by means of flexible tubes 17 to the central distributor 12. The tube 6 is carried in bearings 7 and functions, therefore, simultaneously as rotation shaft around which the cell 1 swivels on tilting.

The pipe-run is connected by a flexible tube 11 to a special water distributor 18 mounted above the main vacuum distributor, the distributor 18 admitting the water to the pipe-run 8 at the needed pressure and at the right moment, i.e., after the discharge of the cake and after or during the washing, known per se, of the cloth of the reversed cell. This water is projected by the pipe-run 8 against the inner face of the cloth 2, the support 3, the cross members 4 and the bottom 5 of the cells 1.

When the cell is straightened out, it passes, according to the invention, beneath the pipe-run 19 supplied with water at a pressure of at least 1kg/cm2 and preferably from 2 to 15 kg/cm2. This pipe-run 19 which extends over the whole length of such cell, directs jets of water of high kinetic energy on to the cloth, so that as these jets strike directly the cloth, they cause a mechanical scouring of the scales eventually formed on the cloth so as to remove them and to take them away mechanically by the stream of water through the cloth under the effect of a vacuum established by means of the distributor 12 to which is connected the tube 6. It is indeed noted that such scales are finely crushed by the action of these jets of water so that they pass easily through the cloth. This provides an essential characteristic of the object of the present invention.

The distributor 12, known per se and therefore not represented in detail in the drawings, enables a vacuum to be established beneath the filtration cloth in the course of the actual filtration operation immediately following the supply of the slurry at the point 14 in order to obtain a substantially dry cake prior to the first washing with water and intermediate different successive washings, as well as to dry the cloth after the last washing thereof prior to supplying the slurry to the point 14. Moreover, the distributor 12 makes it possible to furnish, when the cells are reversed, air to the tube 6 in order to effect a bulging of the cloth and to facilitate thereby the discharge of the cake and the washing of the cloth.

It is well understood, that the invention is not limited to the described embodiments and that many changes may be introduced therein without departing from the scope of the present patent application.

I claim:

1. In a method of operating a continuous filter system which includes at least one filter cell having an open top and a closed bottom with a filter material disposed between the top and bottom and means for supplying slurry to be filtered located above the cell, and in which the cell is moved with its open top upright below the means to supply the slurry thereto in order to fill this cell with slurry over the filter material, the filtrate is removed from the slurry to leave the filtrate cake on the filter material and thereafter the cell is inverted to dump the cake from the cell, the improvement comprising directing a wash water against the filter material to scour the filter material so as to remove the remaining cake material therefrom while the cell is inverted and before it is moved from an inverted position back to an upright position, wash water being supplied into the cell between the bottom and the filter material.

2. A continuous filter system comprising a plurality of cells which are movable through a defined path, each cell having an open top and a closed bottom with a filter material stretched between the sides of the cell between the top and the bottom thereof, slurry supply means located over the path of movement of said cells for supplying a slurry material to be filtered downwardly into the open top of said cells, said cells being movable past said supply means, means connected into said cells between the bottom and the filter material for applying a reduced pressure to said cells beneath said filter in order to aid in the removal of the filtrate therefrom, each of said cells being moved through a path in which it is inverted to dump the cake therefrom, said filter being further moved to restore it to an upright position and to move it back into association with said means for supplying slurry thereto, and wash water supply means for directing a wash water into the cell space provided between the filter material and the bottom of the cells at latest during the time in which it moves from an inverted position back to an upright position.

3. A method for washing a continuous filter which has a tiltable cell and a horizontal filtration cloth, after a filtration cake is formed on the cloth and has been discharged by tilting the cell from a first position into an oppositely facing reversed position and thereafter back to the first position, comprising washing the undersurface of the cloth and the inner parts of the cells in the volume provided in the cell beneath the filtration cloth by introducing washing liquid into said cells volume at least during the time the cells are moved from the reverse position to the first position in which it is oriented for receiving a new quantity of slurry and at least in the portion of said cells subject initially during such movement to an upwardly directed rotation, so that the washing liquid may be subject to a fast flow in said volume under gravity actuation, thus taking along mechanically, i.e., by means of scouring, the scales which may be formed in said cell volume.

4. A method as claimed in claim 3, wherein the washing liquid is introduced in the space beneath the filtration cloth by means of jets of which at least a part is directed immediately towards the inner face of the cloth.

5. A method as claimed in claim 3, wherein the washing of the said cell volume provided beneath the filtration cloth is combined with a prior washing, known per se, of the upper or outside of the filtration cloth after the discharge of the filtration cake and before or at the same time the cells have returned to their normal position.

6. A method as claimed in claim 3, wherein the washing of the said cell volume provided beneath the filtration cloth is combined with a washing of the upperside of the filtration cloth while or after the cells have returned to their normal position by directing jets of high kinetic energy downwards onto the upper or outer face of the filtration cloth, in order to cause a mechanical scouring of possible sediments or scales formed at said face of the filtration cloth, means being provided to evacuate the washing liquid directed onto the upper- or outer face of the filtration by aspiration through the latter.

* * * * *

UNITED STATES PATENT OFFICE
CERTIFICATE OF CORRECTION

Patent No. 3,830,658                     Dated August 20, 1974

Inventor(s)     Armand Davister

It is certified that error appears in the above-identified patent and that said Letters Patent are hereby corrected as shown below:

Convention priority of the corresponding Belgian patent application No. 768.591 filed June 16, 1971 is claimed.

Signed and sealed this 3rd day of June 1975.

(SEAL)
Attest:

RUTH C. MASON
Attesting Officer

C. MARSHALL DANN
Commissioner of Patents
and Trademarks